United States Patent [19]

Yoshida et al.

[11] Patent Number: 4,627,399
[45] Date of Patent: Dec. 9, 1986

[54] LOAD DETECTING APPARATUS AND IGNITION CONTROL APPARATUS FOR INTERNAL COMBUSTION ENGINES

[75] Inventors: Tatsuya Yoshida, Katsuta; Hiroshi Katada, Mito, both of Japan

[73] Assignee: Hitachi, Ltd., Tokyo, Japan

[21] Appl. No.: 699,542

[22] Filed: Feb. 8, 1985

[30] Foreign Application Priority Data

Mar. 7, 1984 [JP] Japan ................................ 59-43358

[51] Int. Cl.$^4$ .............................................. F02P 5/15
[52] U.S. Cl. ...................................... 123/419; 123/618
[58] Field of Search ............... 123/417, 418, 419, 421, 123/436, 609, 618, 650, 414

[56] References Cited

U.S. PATENT DOCUMENTS

| | | | |
|---|---|---|---|
| 4,296,471 | 10/1981 | Goux ................................. | 123/418 X |
| 4,322,800 | 3/1982 | Hisegawa et al. ............... | 123/419 X |
| 4,442,822 | 4/1984 | Kondo et al. .................... | 123/414 X |
| 4,448,171 | 5/1984 | Ninomiya et al. ................ | 123/419 |
| 4,453,521 | 6/1984 | Takasu et al. ..................... | 123/419 |
| 4,494,509 | 1/1985 | Long ................................. | 123/418 X |

Primary Examiner—Willis R. Wolfe, Jr.
Attorney, Agent, or Firm—Antonelli, Terry & Wands

[57] ABSTRACT

In an engine load detecting apparatus and ignition control apparatus for an internal combustion engine, in accordance with the pulse signals from a reference position detector for detecting a plurality of reference positions of a crankshaft of the engine an interval average rotation speed for each of the intervals between the generation of the pulse signals is calculated and the interval average rotation speeds are utilized in such a manner that a speed pulsation value is obtained from the difference between the maximum and minimum ones thereof and an engine speed is obtained from the average value thereof thereby determining an engine load or ignition timing in accordance with the speed pulsation value and the engine speed.

21 Claims, 11 Drawing Figures

LOAD DETECTING APPARATUS AND IGNITION CONTROL APPARATUS FOR INTERNAL COMBUSTION ENGINES

BACKGROUND OF THE INVENTION

The present invention relates to a load detecting apparatus and ignition control apparatus for internal combustion engines.

For the purpose of controlling the ignition timing, conventional ignition systems for internal combustion engines use mainly an intake pressure sensor for detecting the engine load constituting one of the engine parameters, in addition to an air flow sensor, a throttle sensor, etc.

However, it is necessary to mount the intake pressure sensor within the intake pipe with the accompanying mounting difficulties and, particularly in the case of vehicles of the two wheel drive type, it has been difficult to ensure availability of the required sensor mounting space due to the present tendency toward reducing the size of the vehicles.

SUMMARY OF THE INVENTION

It is an object of the present invention to provide an improved apparatus capable of detecting the load on an engine without using any engine load detecting sensor.

It is another object of the invention to provide an apparatus capable of detecting a pulsation of the speed of an engine during a single revolution of its crankshaft and detecting the engine load in accordance with the detected pulsation value.

It is still another object of the invention to provide an apparatus capable of controlling the ignition timing of an engine in accordance with the engine speed pulsation value during each revolution of the crankshaft and other engine parameters.

The present invention features that, in accordance with the pulse signals from a crankshaft reference position detector for detecting a plurality of angular positions of a crankshaft of an engine, the engine speed is determined from the average rotation speeds in the intervals between the given angular positions and an engine speed pulsation value is obtained from the maximum and minimum interval average rotation speeds thereby determining the engine load in accordance with the determined engine speed and pulsation value or controlling the ignition timing of the engine in accordance with the combination of the determined engine speed and pulsation value with other engine parameters.

DESCRIPTION OF THE PREFERRED EMBODIMENTS

The present invention will now be described in greater detail with reference to the drawings.

Figure 1:
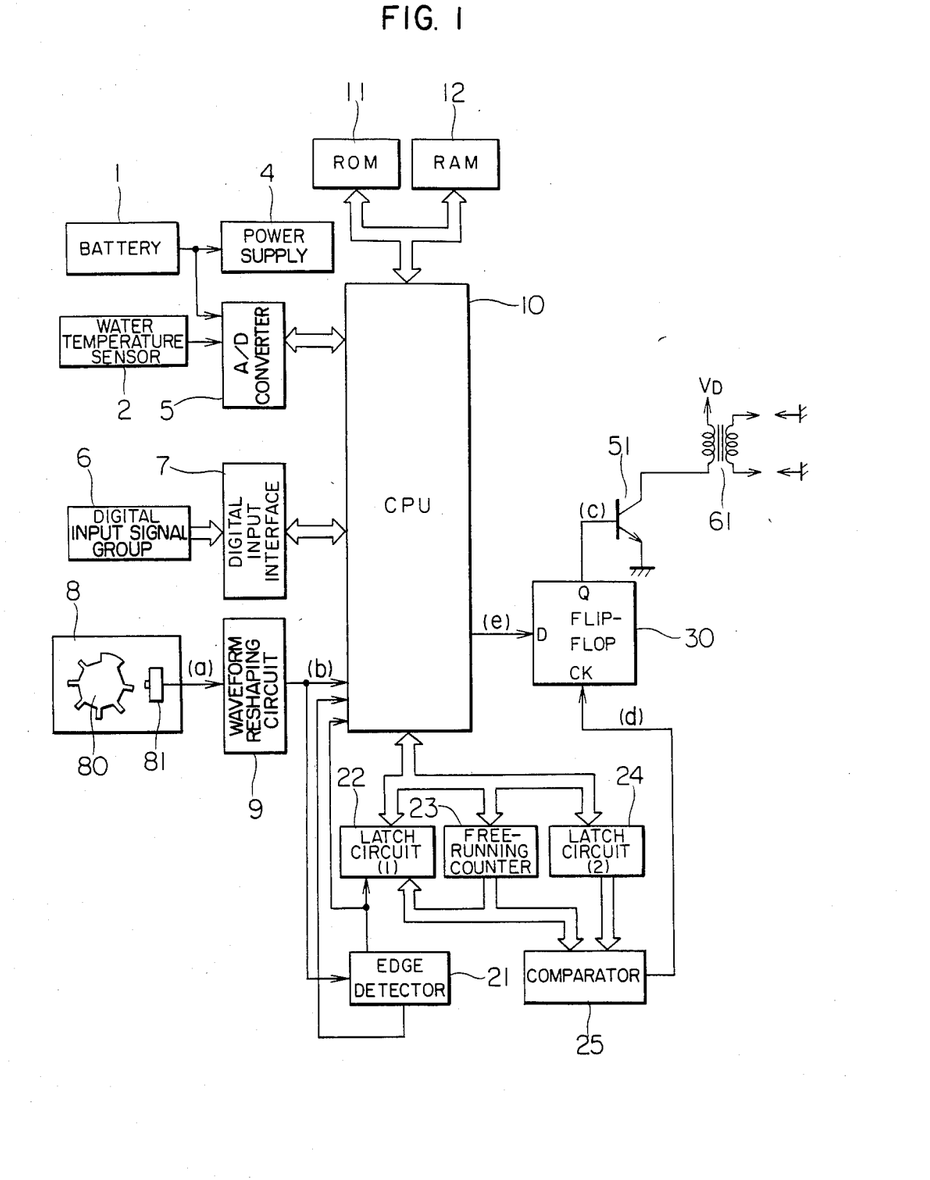
FIG. 1 is a block diagram showing the overall construction of the present invention.

FIG. 1 shows a block diagram of an ignition control apparatus constituting an embodiment of the invention. The ignition control apparatus of this embodiment is applied to a four-cycle, two-cylinder internal combustion engine having an ignition coil for each cylinder.

In the figure, numeral 1 designates a battery connected to a power supply circuit 4 for supplying the power to the respective blocks. Numeral 2 designates a water temperature sensor for detecting the cooling water temperature of the engine. The analog signals from the battery 1 and the water temperature sensor 2 are subjected to A/D conversion by an analog-digital (A/D) converter 5. Each of the A/D converted data is taken at a predetermined timing into a CPU 10.

Numeral 6 designates a group of digital input signals detecting the various engine operating conditions including the idling condition, etc., and the digital signals 6 are supplied to the CPU 10 through a digital input interface 7.

Figure 2:
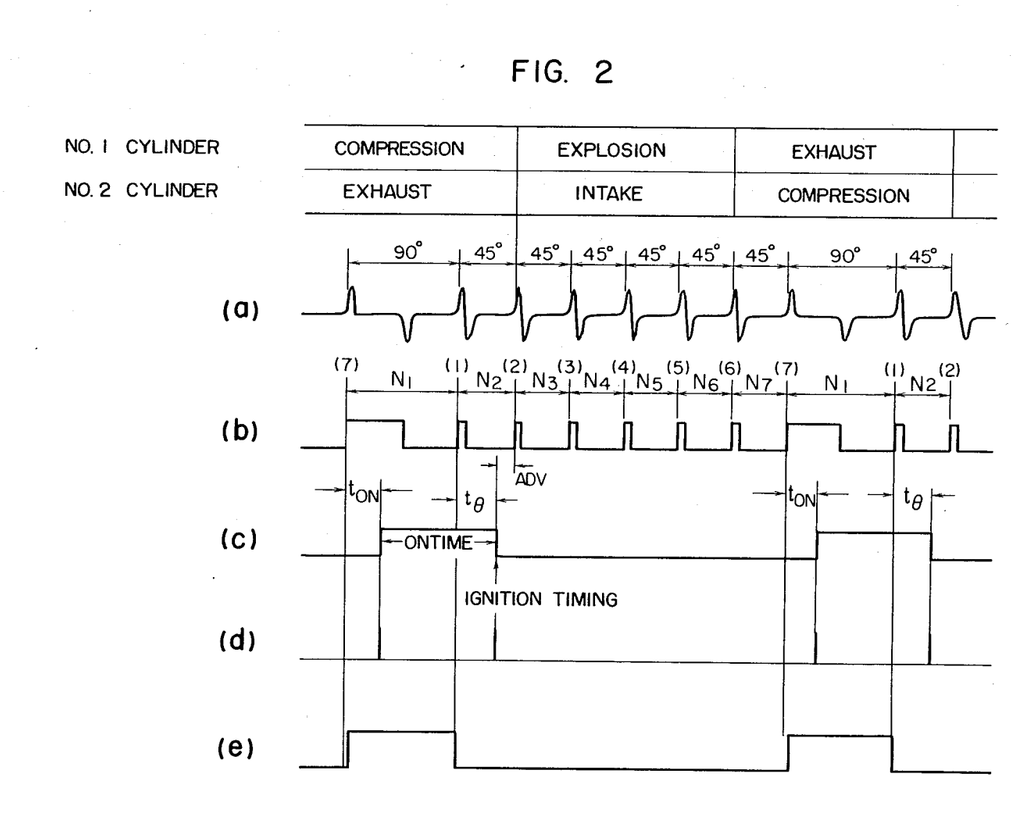
FIG. 2 shows a plurality of waveforms at various points in FIG. 1 which are useful for explaining the operation of the invention.

Numeral 8 designates a crankshaft reference position detector including a magnetic rotor 80 rotatable in synchronism with the crankshaft of the engine and a magnetic pickup sensor 81. The magnetic rotor 80 is formed with a plurality of projections arranged at intervals of 45° crank angle and one of the projections has a greater width than the other projections and an interval of 90°. When each of the projections passes nearby the magnetic pickup sensor 81, positive and negative pulses are generated at the ends of each projection as shown in FIG. 2(a). The pulses are reshaped by a waveform reshaping circuit 9 and crankshaft reference position pulses are generated as shown in FIG. 2(b). These reference position pulses are numbered as No. 1 to No. 7 in order of their positions from the pulse having the greater pulse width.

Numeral 23 designates a free-running counter adapted to always perform its counting operation at a predetermined period (e.g., at intervals of 1 μsec in this embodiment). Numeral 21 designates an edge detector for detecting the leading or falling edge of each reference position pulse shown in FIG. 2(b) so as to send an interrupt signal to the CPU 10 and also send a leading edge-induced timing signal to a first latch circuit 22. When the signal is applied from the edge detector 21, the latch circuit 22 holds the value of the free-running counter 23. In other words, the value of the free-running counter 23 at the time of the leading edge of each reference position signal is held until the arrival of the leading edge of the next reference position signal.

The CPU 10 receives these input signals so that in accordance with the program preliminarily stored in ROM 11, the corresponding average rotation speeds and engine speed pulsation value are inputted and the desired ignition advance angle and dwell or energization time are calculated. In accordance with the results of these calculations, ignition timing data and energization starting timing data which are to be generated actually are computed. This operation will be described later in detail. Numeral 12 designates a read/write storage device or RAM for storing data varying from moment to moment, etc.

Numeral 24 designates a second latch circuit for holding the energization starting timing data and the ignition timing data from the CPU 10. The energization starting timing data is one relating to a time interval $t_{ON}$ from the leading edge of an No. 7 pulse to the energization starting point as shown in FIG. 2(c) and the data is set in the second latch circuit 24 at an early time after the leading edge of the No. 7 pulse. Also, the ignition timing data is one relating to a time interval $t_\theta$ from the leading edge of a No. 1 pulse to the end of the energization or the ignition timing and the data is set in the second latch circuit 24 at an early time after the leading edge of the No. 1 pulse. The content of the second latch circuit 24 and the value of the free-running counter 23 are always compared by a comparator 25 so that the comparator 25 generates a pulse as shown in FIG. 2(d) when the two coincide. The pulse from the comparator 25 is supplied to the clock terminal of the flip-flop 30. Also, as shown in FIG. 2(e), the CPU 10 supplies to the D terminal of the flip-flop 30 a pulse which goes to a high level in synchronism with the leading edge of the No. 7 pulse and to a low level in synchronism with the leading edge of the No. 1 pulse. When the pulse is applied to the clock terminal of the flip-flop 30, the Q output terminal goes to the high level if the D terminal is at the high level and also the Q output terminal goes to the low level if the D terminal is at the low level. As a result, the flip-flop 30 supplies the ignition control signal shown in FIG. 2(c) to a power transistor 51 which in turn is turned on and off to drive an ignition coil 61.

Figure 3:
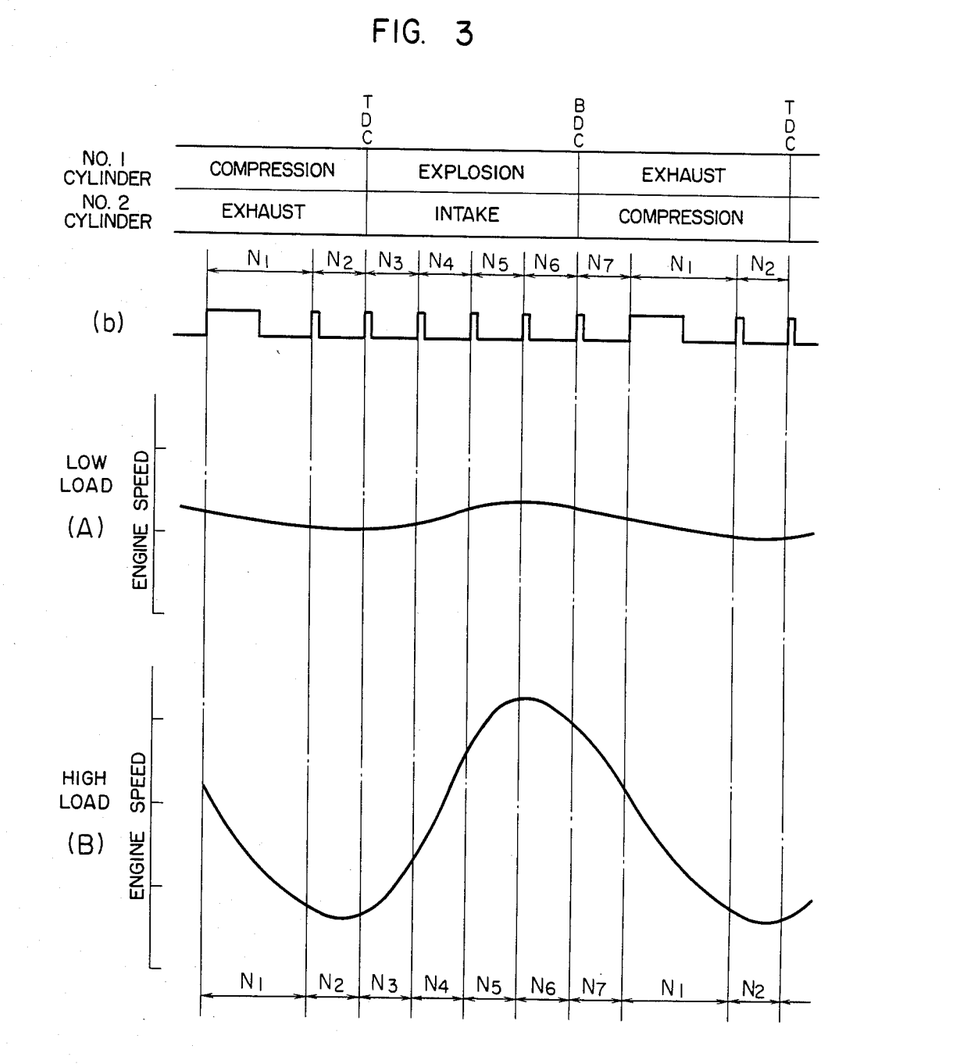
FIG. 3 is a diagram for explaining the concept of the invention.

The method of detecting the engine load on the basis of an engine speed pulsation will now be described. FIG. 3(A) shows a variation of the engine speed under low load conditions and FIG. 3(B) shows a variation of the engine speed under high load conditions. $N_2$ represents the average rotation speed for the 45° BTDC interval. Similarly, $N_1$ to $N_7$ represent the average rotation speeds for the respective crankshaft positions. It will be seen that under the low load conditions shown in FIG. 3(A) the rise in the engine speeds $N_3$ to $N_6$ due to the explosion stroke and the decrease in the rotation speeds $N_7$ to $N_2$ due to the compression stroke are small thus showing practically no engine speed pulsation and that under the high load conditions shown in FIG. 3(B) the rise in the rotation speeds $N_3$ to $N_6$ due to the explosion stroke and the decrease in the rotation speeds $N_7$ to $N_2$ due to the compression stroke are large thus showing a large engine speed pulsation.

This relation means that the magnitude of the amplitude of the engine speed pulsation is practically determined by the magnitude of the load and hence it means that detection of the amplitude of the engine speed pulsation (in this embodiment the difference between the maximum and minimum values of the pulsation) results in the detection of the engine load thereby eliminating the use of a load detecting sensor as previously required.

Figure 4:
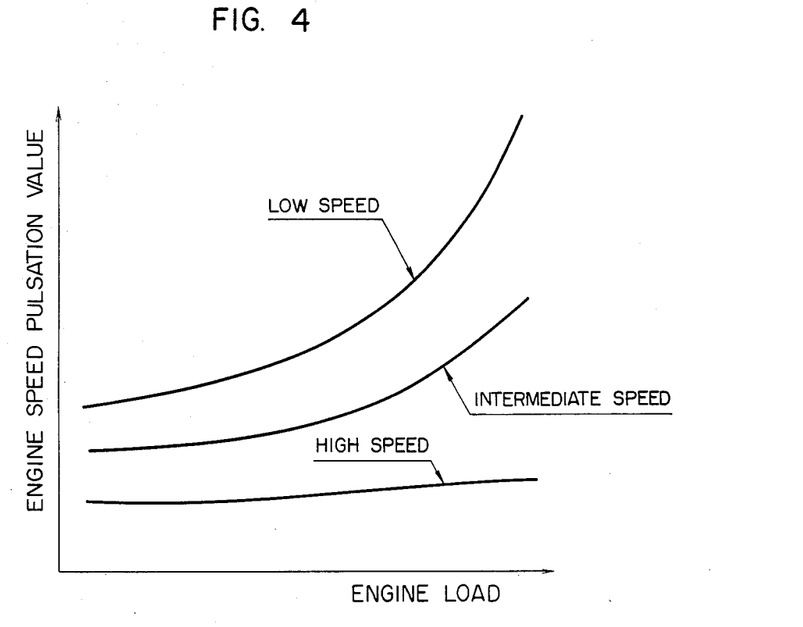
FIG. 4 shows experimental data for obtaining the data required for carrying out the invention.
Figure 5:
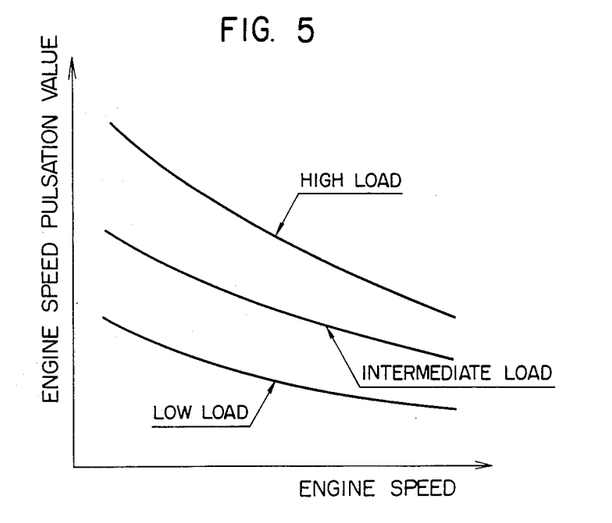
FIG. 5 shows an engine load searching map according to the invention.

FIG. 4 is a graph obtained by actually measuring the values of the engine speed pulsation by maintaining the engine speed at predetermined values and varying the engine load and it shows the results obtained under the high, intermediate and low speed operations, respectively. From these results it will be seen that there is a fixed corresponding relation between the value of the engine speed pulsation and the engine load. By using the results of FIG. 4, it is possible to prepare a map for determining the desired engine load in accordance with the engine speed and the engine speed pulsation value as shown in FIG. 5.

Figure 6:
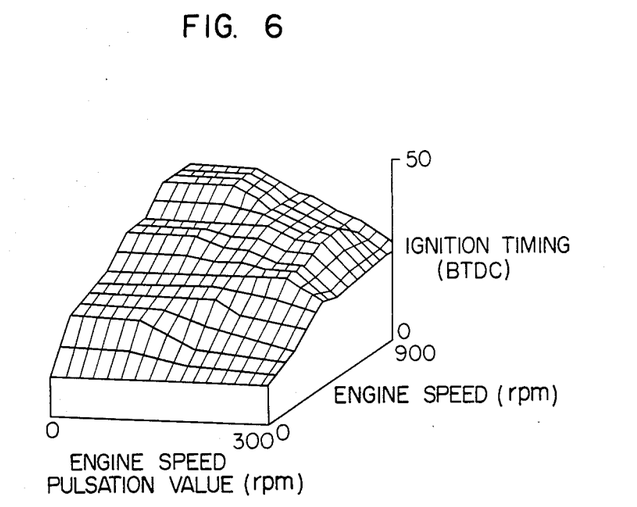
FIG. 6 shows an ignition timing searching map according to the invention.

In the past, the ignition timing control has been performed by means of a map for searching the desired ignition timing in accordance with the engine load and speed. In accordance with the invention, however, the engine load is given in terms of an engine speed pulsation value and therefore the desired ignition timing can be searched in accordance with the engine speed pulsation value and the engine speed as shown in FIG. 6.

Figure 7:
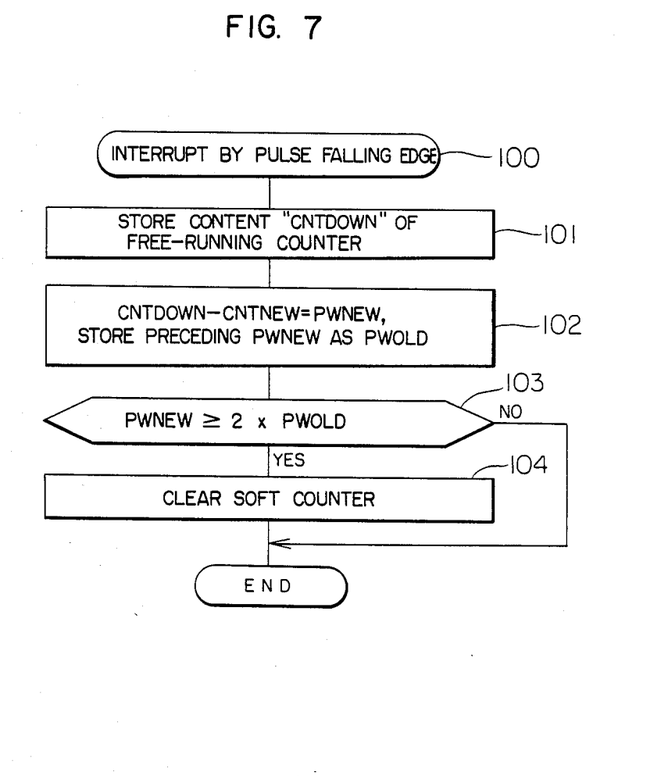
FIG. 7 shows a flow chart according to the invention in which an interrupt is executed in response to the falling edge of each pulse.

Next, the operation of the CPU 10 for obtaining the desired energization starting timing data and ignition timing data will be described. FIG. 7 is a flow chart for explaining the operation of setting the numbers of the reference position pulses shown in FIG. 2(b) which is performed in connection with the searching of the data. At a step 100, the CPU 10 detects the falling edge of each pulse of FIG. 2(b) by a pulse from the edge detector 21 shown in FIG. 1 and performs an interruption for the program shown in FIG. 7. In synchronism with the falling edge of the pulse, the content (CNTDOWN) of the freerunning counter 23 is stored in the RAM 12 at a step 101. At a step 102, the count value CNTNEW at the time of the leading edge of this pulse is subtracted from the value CNTDOWN. The resulting difference value is a time value PWNEW corresponding to the pulse width. When this occurs, the previously obtained PWNEW is stored as PWOLD in the RAM 12. The inputting of the count value CNTNEW will be described later in connection with FIG. 8. At a step 103, a decision is made as to whether the newly inputted pulse width PWNEW is greater than two times the previously inputted pulse width PWOLD. The purpose of the step 103 is to detect the No. 7 pulse of the greater width in FIG. 2(b) so that if the decision results in "YES" indicating the detection of the No. 7 pulse, the soft counter included in the CPU 10 is reset to count sequentially the following reference position pulses starting at the next No. 1 pulse. If the decision of the step 103 is "NO", then it is determined that the pulse is not the No. 7 pulse and thus the program is ended.

Figure 8:
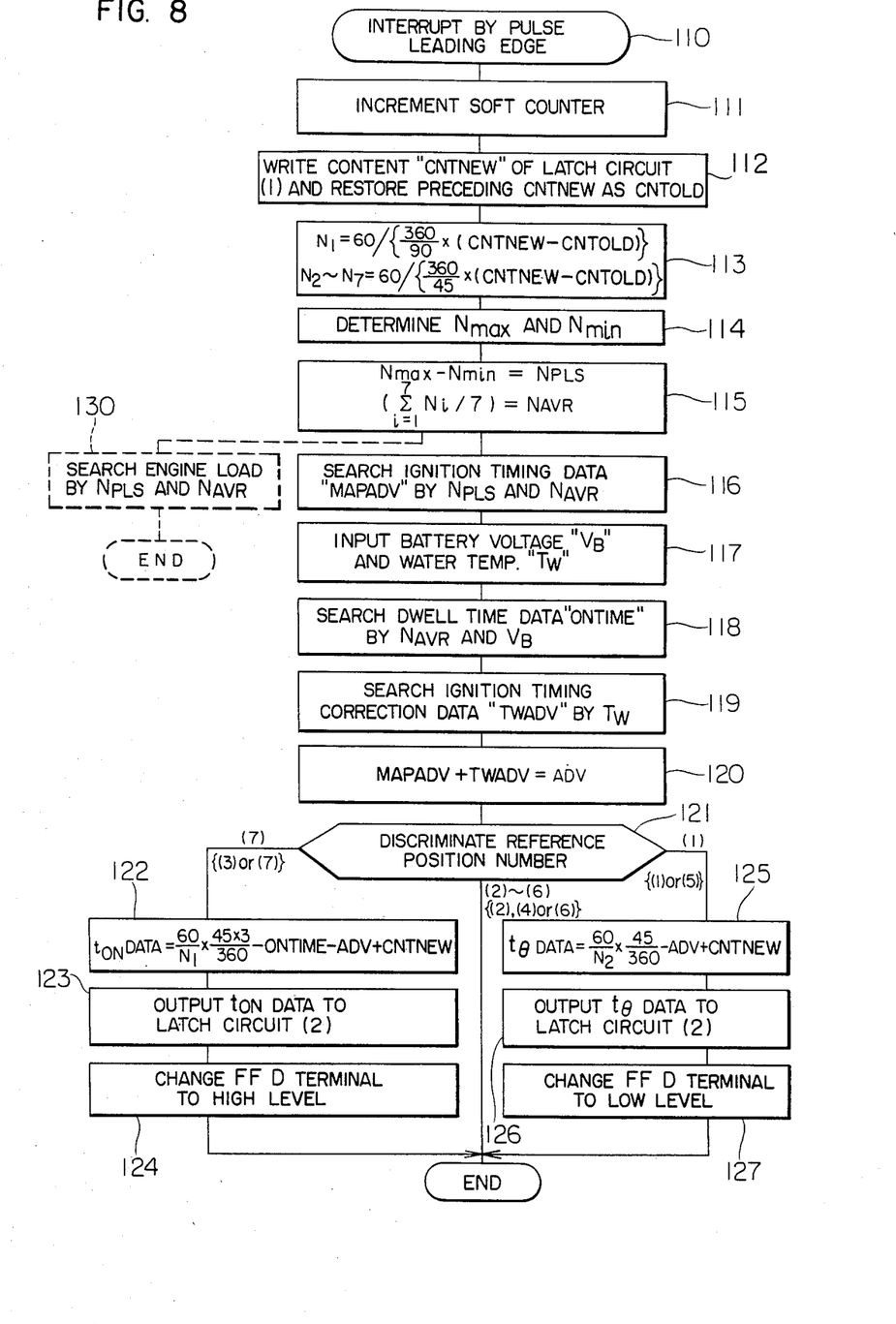
FIG. 8 shows a flow chart according to the invention in which an interrupt is executed in response to the leading edge of each pulse.

FIG. 8 shows a program performed upon interrupt made at a step 110 by the pulse from the edge detector 21 detecting the leading edge of each pulse shown in FIG. 2(b). In response to the interrupt, the soft counter mentioned in connection with the step 104 of FIG. 7 is incremented by 1. Therefore, the content of the soft counter indicates the number of the reference position pulse whose leading edge was detected. At a step 112, the content CNTNEW of the first latch circuit 22 into which the content of the free-running counter 23 was set in response to the leading edge of the pulse in question is stored in the RAM 12 and the previously stored value CNTNEW is restored as CNTOLD in the RAM 12. At a step 113, the count value CNTOLD at the time of the previous pulse leading edge is subtracted from the newly stored count value CNTNEW to detect the pulse spacing or interval. This difference value is based on the values counted at intervals of 1 μsec by the free-running counter 23 and therefore it is a value having a time dimension. Thus, while the values CNTNEW, CNTOLD, etc., are given in terms of μsec, in the discussion to follow these values will be considered as representing those given in terms of sec for purposes of description. Since the interval between the pulses is obtained by the above subtraction, the average rotation speeds for the intervals between the pulses are given by the following equations.

$$N_1 = 60/\{360/90 \times (CNTNEW - CNTOLD)\}$$

$$N_2 \text{ to } N_7 = 60/\{360/45 \times (CNTNEW - CNTOLD)\}$$

At the step 113, the pulse-interval average rotation speed is obtained for the pulse in question and it is stored in the RAM 12. Thus, when the number of interrupts made at the step 110 becomes 8 or over, the average rotation speeds $N_1$ to $N_7$ for the reference position pulse intervals shown in FIG. 3 are stored in the RAM 12 and the pulsation of the engine speed for one revolution of the crankshaft is represented.

Figure 9:
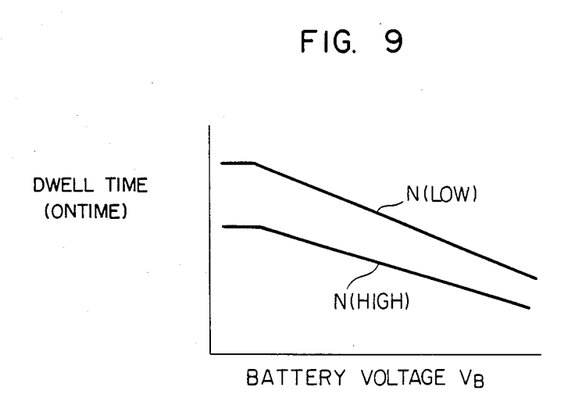
FIG. 9 shows a dwell time searching map according to the invention.
Figure 10:
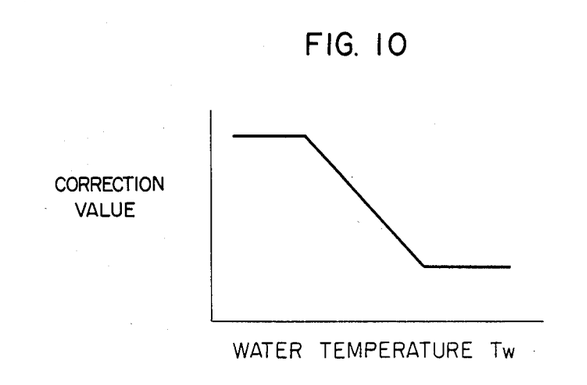
FIG. 10 shows a map according to the invention for searching an ignition timing correction value in accordance with a water temperature.

At a step 114, the maximum rotation speed $N_{max}$ and the minimum rotation speed $N_{min}$ of the interval average rotation speeds $N_1$ to $N_7$ are obtained, and then their difference $N_{max} - N_{min}$ is computed and stored as an engine speed pulsation value $N_{PLS}$ in the RAM 12 at a step 115. Also, at the step 115, the average value $$\sum_{i=1}^{7} N_i / 7$$

of the interval average rotation speeds $N_1$ to $N_7$ is calculated and stored as an engine speed $N_{AVR}$ in the RAM 12. Then, in accordance with the engine speed pulsation value $N_{PLS}$ and the engine speed $N_{AVR}$ the desired ignition timing data MAPADV is obtained by searching the map preliminarily stored in the ROM 11, that is, the map shown in FIG. 6 for searching the desired ignition timing or the advance position from the top dead center at a step 116. At a step 117, the voltage $V_B$ of the battery 1 and the water temperature $T_W$ detected by the water temperature sensor 2 are stored in the RAM 12 through the A/D converter 5. Then, at a step 118, in accordance with the engine speed $N_{AVR}$ and the battery voltage $V_B$ the dwell time ONTIME shown in FIG. 2(c) is searched from the map stored in the ROM 11 and shown in FIG. 9. FIG. 9 shows the upper limit N (High) and the lower limit N (Low) of the engine speed and the intermediary speeds are obtainable by the interpolation process. At a step 119, the desired ignition timing correction data TWADV is searched from the map stored in the ROM 11 and shown in FIG. 10 in accordance with the water temperature $T_W$. Then, at a step 120, the desired ignition advance angle ADV is obtained by adding the ignition timing correction data TWADV to the ignition timing data MAPADV obtained at the step 116. At a step 121, the number of the crankshaft reference position signal is determined in accordance with the content of the soft counter. If it is determined that the signal is the No. 7 pulse, as shown in FIG. 2(c), the supply of current to the ignition coil must be started after the expiration of a time $t_{ON}$ from the leading edge of this pulse and hence the data relating to the time $t_{ON}$ must be set in the second latch circuit 24. The interval average rotation speed for the No. 7 pulse is $N_1$ and therefore the time corresponding to the interval between the No. 7 pulse and the No. 1 pulse is given by $$\frac{60}{N_1} \times \frac{45 \times 3}{360}.$$

Thus at a step 122, the time $$T_{ON} = \frac{60}{N_1} \times \frac{45 \times 3}{360} - ONTIME - ADV$$

is calculated and it is combined with the count value CNTNEW of the free-running counter 23 at the time of the leading edge of the No. 7 pulse thereby obtaining the desired energization starting timing data $t_{ON}$DATA. This data is set in the second latch circuit 24 at a step 123. Then, at a step 124, the input to the D terminal of the flip-flop 30 is changed to the high level as shown in FIG. 2(e) and the program is ended.

If the decision of the step 121 shows that the pulse number is any of the No. 2 to No. 6, the program is ended. If the step 121 determines that the pulse is the No. 1 pulse, at a step 125, the time $$t_\theta = \frac{60}{N_2} \times \frac{45}{360} - ADV$$

shown in FIG. 2(c) is calculated and the result is combined with the count value CNTNEW of the free-running counter 23 at the time of the leading edge of the No. 1 pulse thus calculating the desired ignition timing data $t_\theta$DATA. This ignition timing data is set in the second latch circuit 24 at a step 126. Then, at a step 127, the signal of FIG. 2(e) applied to the D terminal of the flip-flop 30 is changed to the low level and the program is ended.

In this way, the data $t_{ON}$DATA or $t_\theta$DATA is set in the second latch circuit 24 at an early time after the leading edge of the No. 7 pulse or the No. 1 pulse and the pulse shown in FIG. 2(d) is generated upon the detection of the coincidence by the comparator 25. Thus, the ignition control signal shown in FIG. 2(c) is generated at the Q output of the flip-flop 30 and the current in the ignition coil 61 is controlled through the power transistor 51 thereby generating an ignition signal.

It is to be noted that when the engine load is to be detected, in FIG. 8 a transfer is made from the step 116 to a step 130 shown by the broken line and the engine load is searched from the map shown in FIG. 5 in accordance with the engine speed pulsation value $N_{PLS}$ and the engine speed $N_{AVR}$.

Figure 11:
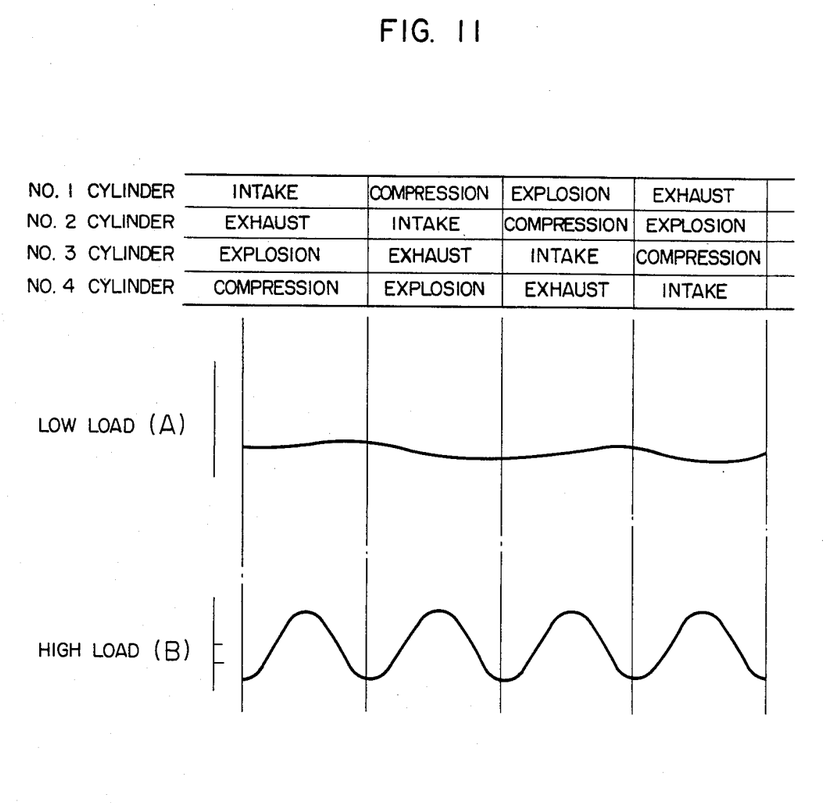
FIG. 11 is a diagram useful for explaining another embodiment of the invention.

While the above-described embodiment is applied to the two-cylinder engine, the invention is also applicable to four-cylinder engines in view of the fact that, as shown in FIG. 11, the amplitude of the engine speed pulsation varies practically in proportion to the magnitude of the engine load as in the case of the two-cylinder engine, though the period and amplitude of the pulsation are not the same in degree.

While the ignition is effected at intervals of 360° in the two-cylinder engine, the ignition is effected at intervals of 180° in the four-cylinder engine. Thus, in an embodiment applied to the four-cylinder engine, at the step 121 in FIG. 8, the corresponding processing is effected in dependence on the discrimination of any of the pulses of the numbers shown in the parentheses in the figure thus effecting the ignition timing control in the like manner as described in connection with the two-cylinder engine. In other words, if the decision of the step 121 indicates the No. 3 pulse or the No. 7 pulse, a transfer is made to the step 122. If the decision indicates the No. 2 pulse, No. 4 pulse or No. 6 pulse, the program of FIG. 8 is ended. If the decision indicates the No. 1 pulse or the No. 5 pulse, a transfer is made to the step 125 and the same processing as mentioned previously is performed.

From the foregoing description it will be seen that in accordance with the invention the load of an engine can be detected in accordance with the pulsation value of the engine speed without using any engine load detecting sensor and also the ignition control can be effected in accordance with the engine speed pulsation value and other engine parameters.

We claim:

1. An ignition control apparatus for an internal combustion engine comprising:
   a crankshaft reference position detector for detecting a plurality of reference angular positions of a crankshaft of an engine and for producing pulse signals at said reference angular positions;
   means responsive to said pulse signals from said crankshaft reference position detector for determining the interval rotation speed of the engine for each of the intervals between said pulses;
   means responsive to said interval rotation speeds from said interval rotation speed determining means for determining a speed pulsation value for each revolution of said crankshaft;
   means for determining the speed of said engine; and
   means for controlling the ignition of said engine in accordance with said speed pulsation value from said speed pulsation value determining means and said engine speed from said engine speed determining means.

2. An apparatus according to claim 1, wherein said ignition control means comprises:
   means for determining a current supply starting timing of an ignition coil of said engine;
   means for determining an ignition timing of said engine in accordance with said speed pulsation value and said engine speed; and
   means for starting the supply of current to said ignition coil at said timing determined by said current supply starting timing determining means and for interrupting the current flow in said ignition coil at said timing determined by said ignition timing determining means.

3. An apparatus according to claim 2, wherein said current supply starting timing determining means comprises:
   means for detecting a voltage of a battery of said engine;
   means for determining a duration time of current supply to said ignition coil in accordance with said battery voltage value from said voltage detecting means and said engine speed from said engine speed determining means; and
   means for commanding the supply of current to said ignition coil to start at a time preceding said ignition timing determined by said ignition timing determining means by said duration time determined by said duration time determining means.

4. An apparatus according to claim 3, wherein said duration time determining means comprises means for searching a map preliminarily stored in a memory in accordance with said battery voltage value and said engine speed.

5. An ignition control apparatus for an internal combustion engine comprising:
   a crankshaft reference position detector for detecting a plurality of reference angular positions of a crankshaft of an engine and for producing pulse signals at said reference angular positions;
   means for discriminating each of said pulse signals from said crankshaft reference position detector in correspondence with one of said crankshaft reference positions;
   a counter for counting clock pulses having a period significantly shorter than the rotational period of said crankshaft;
   means for receiving a count value of said counter each time one of said pulse signals from crankshaft reference position detector is received;
   means for calculating an interval rotation speed for each of the intervals between said pulse signals in accordance with the difference between said count values successively received by said count value receiving means;
   means responsive to said interval rotation speeds calculated by said interval rotation speed calculating means to determine a speed pulsation value for each revolution of said crankshaft;
   means for determining the speed of said engine;
   ignition timing determining means responsive to said speed pulsation value and said engine speed to determine a rotation angle from predetermined first one of said crankshaft reference positions discriminated by said reference position discriminating means to an ignition timing;
   energization starting timing determining means for determining a rotational angle from a predetermined second one of said crankshaft reference positions discriminated by said reference position discriminating means to an ignition coil energization starting timing; and
   an ignition circuit for starting the supply of current to said ignition coil at said energization starting timing and interrupting the current supply to said ignition coil at said ignition timing.

6. An apparatus according to claim 5, wherein said ignition circuit comprises:
   a latch circuit for setting therein each of said energization starting timing determined by said energization starting timing determining means and said ignition timing determined by said ignition timing determining means in terms of a value corresponding to a count value of said clock counter in synchronism with the timing of said predetermined first or second crankshaft reference position;
   means for comparing each of said set values with the count value of said clock counter to detect the coincidence therebetween; and
   means responsive to the detection of the coincidence by said coincidence detecting means to either start or interrupt the supply of current to said ignition coil in accordance with the discrimination of said reference position discriminating means.

7. An apparatus according to claim 5, wherein said crankshaft reference position detector is constructed such that the pulse corresponding to at least one of said reference positions differs in pulse width from the pulses corresponding to the other reference positions.

8. An apparatus according to claim 7, wherein said crankshaft reference position discriminating means comprises:
reference pulse discriminating means for discriminating said at least one reference position;
a counter resettable in response to the discrimination of said at least one reference position by said reference pulse discriminating means to count the pulse signals from said reference position detector; and
means for selectively discriminating said reference positions in accordance with a count value of said pulse signal counter.

9. An engine load detecting apparatus for an internal combustion engine comprising:
a crankshaft reference position detector for detecting a plurality of reference angular positions of a crankshaft of an engine and for producing pulse signals at said reference angular positions;
means responsive to said pulse signals from said crankshaft reference position detector for determining the interval rotation speed of the engine for each of the intervals between said pulses;
means responsive to said interval rotation speeds from said interval rotation speed determining means for determining a speed pulsation value for each revolution of said crankshaft;
means for determining the speed of said engine; and
means for determining the load on said engine in accordance with said speed pulsation value from said speed pulsation value determining means and said engine speed from said engine speed determining means.

10. An apparatus according to claim 9, wherein said speed pulsation value determining means comprises:
means for determining maximum and minimum ones of said interval rotation speeds determined by said interval rotation speed determining means; and
means for calculating the difference between said maximum and minimum interval rotation speeds determined by said maximum and minimum interval rotation speeds determining means and for determining said difference value as said speed pulsation value.

11. An apparatus according to claim 9, wherein said engine speed determining means comprises means for calculating an average value of said interval rotation speeds and determining said average value as said engine speed.

12. An apparatus according to claim 9, wherein said engine load determining means comprises means for determining said engine load by searching a map preliminarily stored in a second memory in accordance with said speed pulsation value and said engine speed.

13. An apparatus according to claim 9, wherein said interval rotation speed determining means comprises:
a counter for counting clock pulses having a predetermined period significantly shorter than the rotational period of said crankshaft;
means for receiving a count value of said counter each time one of said pulse signals is received from said crankshaft reference position detector; and
means for calculating said interval rotation speeds between said pulse signals in accordance with the difference between said count values successively received by said count value receiving means.

14. An apparatus according to claim 13, wherein said counter is a free-running counter.

15. An apparatus according to claim 13, wherein said count value receiving means comprises:
an edge detector for generating a pulse in response to a leading edge of each of said pulse signals from said crankshaft reference position detector;
a first latch circuit for setting therein the count value of said counter in response to the pulse from said edge detector; and
means for storing the count value set in said latch circuit in a first memory.

16. An apparatus according to claim 9, wherein said crankshaft reference position detector comprises:
a rotating member rotatable in synchronism with said cranksaft;
a pickup sensor for detecting a pluraltiy of predetermined angular positions of said rotating member; and
a circuit for reshaping the waveform of signals detected by said pickup sensor.

17. An apparatus according to claim 16, wherein said rotating member includes a plurality of projections arranged at intervals of a predetermined rotational angle on an outer periphery thereof.

18. An apparatus according to claim 17, wherein said projections are arranged at intervals of 45 degrees of crankshaft rotation.

19. An apparatus according to claim 17, wherein said rotating member is made of a magnetic material, and wherein said pickup sensor comprises a magnetic pickup for detecting said projections.

20. An apparatus according to claim 17, wherein one of said projections is greater in width than the other thereof in the direction of said rotational angle.

21. An apparatus according to claim 20, wherein said waveform reshaping circuit includes means for generating a plurality of pulses, each pulse having a pulse width corresponding to the rotational direction width of one of said projections.

* * * * *